Patented July 27, 1937

2,088,367

UNITED STATES PATENT OFFICE 2,088,367

MANUFACTURE OF POLYMERIZATION PRODUCTS FROM ALDOLS

John Vargas Eyre and Herbert Langwell, Epsom, England

No Drawing. Application March 17, 1934, Serial No. 716,222. In Great Britain April 1, 1933

7 Claims. (Cl. 260—140)

This invention relates to the manufacture of polymerization products from aldols.

In the manufacture of aldol condensation products using alkalies as catalyst, insoluble resins are usually obtained. In our co-pending Patent application Ser. No. 694,191, Patent No. 2,016,630 the process for the production in high yields of such a product from aldol is described.

We have now found that by suitable control of the conditions during the reaction, aldols may be polymerized without at the same time undergoing appreciable condensation. The products so obtained are novel and characteristic and have almost the same composition as aldol but a greater molecular weight, i. e. they are simple polymers.

The process for preparing these polymers differs from that used for preparing products of the resin type in that more accurate control of the alkalinity is necessary.

According to the present invention we employ as alkali a relatively soluble one such as sodium or potassium hydroxide or carbonate rendered substantially inert by being added to a solution of a salt of magnesium or of an alkali earth metal as precipitant in situ of magnesium hydroxide or alkali earth metal hydroxide. The amount of water used should range from an amount not substantially less than the amount of aldol used to several times that amount.

The rate of reaction may be adjusted by controlling the temperature at which it occurs.

The following example illustrates in detail the manner in which the invention can be carried into effect and the results obtained.

2.5 litres of technical aldol, 2.5 litres of water and 250 grs. of $MgCl_2.6H_2O$ were mixed and to the mixture was slowly added with stirring 70 grms. of caustic soda dissolved in 150 ccs. water. When the whole was mixed it was heated to 50–60° C. for nine hours. The aldol used had a carbonyl radical (: CO) value of 39.0 per cent. After the heating for nine hours at 50–60° C. the carbonyl radical (: CO) value of the mixture had fallen to 12.7 per cent. calculated with respect to the aldol used.

The resulting solution when neutralized with, for example, carbonic acid and filtered was a clear, faintly yellow solution containing only small amounts of aldehyde resin which were removable by extraction with chloroform leaving an almost water-white product, soluble in water and having almost the same percentage composition as aldol itself.

$CaCl_2.6H_2O$ may be substituted in the above example in stoichiometric ratio for the $MgCl_2.6H_2O$.

What we claim is:—

1. The process of producing from aldol polymerization products thereof substantially free from condensation products comprising reacting the aldol with caustic alkali rendered substantially inert by precipitating reaction with a soluble salt of a metal taken from the group consisting of alkali earth metals and magnesium, the amount of water employed being in an amount not substantially less than the amount of aldol used.

2. The process of producing from aldol polymerization products thereof substantially free from condensation products, comprising reacting the aldol with magnesium hydroxide precipitated in situ by reacting caustic alkali with a soluble salt of magnesium in the presence of the aldol, the amount of water present being in an amount not substantially less than the amount of aldol used.

3. The process of producing from aldol polymerization products thereof substantially free from condensation products, comprising reacting the aldol with magnesium hydroxide precipitated in situ by reacting caustic alkali with a soluble salt of magnesium in the presence of the aldol, the amount of water present being substantially equal to the amount of aldol used.

4. The process of producing from aldol polymerization products thereof substantially free from condensation products, comprising reacting the aldol with calcium hydroxide precipitated in situ by reacting caustic alkali with a soluble salt of calcium in the presence of the aldol, the amount of water present being in an amount not substantially less than the amount of aldol used.

5. The process of producing from aldol polymerization products thereof substantially free from condensation products, comprising reacting the aldol with calcium hydroxide precipitated in situ by reacting caustic alkali with a soluble salt of calcium in the presence of the aldol, the amount of water present being substantially equal to the amount of aldol used.

6. The process of producing from aldol polymerization products thereof substantially free from condensation products, comprising mixing aldol with a solution of a magnesium salt and slowly adding thereto a solution of caustic alkali, heating the mixture, and changing the magnesium hydroxide to a compound separable from the solution.

7. The process of producing from acetaldol a polymerization product thereof substantially free from resinous condensation products, comprising mixing aldol, water and magnesium chloride (MgCl$_2$.6H$_2$O) in the ratio of 2.5 litres, 2.5 litres and 250 grams respectively, adding thereto slowly a solution of 70 grams of caustic soda in 150 ccs. of water, heating to about 50° C. to 60° C. for about nine hours, and changing the magnesium hydroxide to a compound separable from the solution.

JOHN VARGAS EYRE.
HERBERT LANGWELL.